Aug. 13, 1968    C. J. SLAGA    3,396,932

ROTATING ARTICLE DISPLAY MOUNT

Filed Sept. 29, 1966    2 Sheets-Sheet 1

INVENTOR.
CASE J. SLAGA
BY PENDLETON, NEUMAN
SEIBOLD & WILLIAMS

ATTORNEYS

Aug. 13, 1968   C. J. SLAGA   3,396,932
ROTATING ARTICLE DISPLAY MOUNT
Filed Sept. 29, 1966   2 Sheets-Sheet 2

INVENTOR.
CASE J. SLAGA
BY PENDLETON, NEUMAN
SEIBOLD & WILLIAMS

ATTORNEYS

United States Patent Office 3,396,932
Patented Aug. 13, 1968

3,396,932
ROTATING ARTICLE DISPLAY MOUNT
Case J. Slaga, Hinsdale, Ill., assignor to Advertising Metal Display Co., Cicero, Ill., a corporation of Illinois
Filed Sept. 29, 1966, Ser. No. 582,992
5 Claims. (Cl. 248—349)

ABSTRACT OF THE DISCLOSURE

The rotating article display mount has a base with a first annular sheet metal disc attached thereto, and a second annular sheet metal disc is attached to the article-supporting fixture. A sheet metal driven member is disposed between the two annular discs, and the peripheral portions thereof are formed about the edges of the discs so that the discs and the driven member are held in proximate assembled relationship but are permitted to rotate relative to one another. A first annular ball bearing raceway is disposed remote from and concentric with the axis of rotation of the driven member and is formed partially by the first annular disc and partially by the driven member. A second annular ball bearing raceway which is in abutting, vertically aligned, concentric relationship with the first raceway is formed partially by the second annular disc and partially by the driven member, and ball bearings are disposed in the two raceways. A load force applied to the article-supporting means is thus transmitted directly through the raceways and the ball bearings to the base. An electric motor in the base rotates the driven member about its axis with respect to the base.

This invention relates to a rotating article display mount and more particularly to a display mount which is driven by a motor but may be manually rotated or stopped independently of the operation of the motor.

The simplest and most convenient way of producing a rotating display is to connect the driving motor directly to the article-supporting member, perhaps through a gear reducer. Difficulty, however, is encountered, particularly in the case of a relatively heavy article which is being displayed, such as an air conditioner, because any manual change in the normal speed of operation can easily result in damage to the gears used to drive the article support. Since there is a tendency on the part of purchasers to manually manipulate displays, the danger of stripping of the gear teeth presents a substantial problem in rotating displays.

It is an object of this invention to provide an improved rotating article display mount which will permit manual manipulation of the article being displayed.

It is another object of this invention to provide a rotating article display mount which will allow the article and the article support to be stopped, reversed or speeded up manually without endangering the driving mechanism or altering the speed of the motor.

It is a further object of this invention to provide a relatively free wheeling article display mount which is motor-operated and yet may be freely and manually stopped, reversed or speeded up.

It is still another object of this invention to provide an inexpensive frictional drive connection between the drive motor and the article support.

Other objects of the invention may be seen and a further understanding of the invention may be had by referring to the following description and claims taken in conjunction with the accompanying drawings.

In accordance with one embodiment of this invention, the rotating article display mount comprises a fixed member or base, a driven member mounted for rotation about its axis relative to the fixed member, a motor for effecting rotation of the driven member, and an article-supporting member mounted for rotation relative to the driven member about an axis concentric with the axis of rotation of the driven member. The invention features means for effecting a light frictional connection between the driven member and the article-supporting member, this frictional connection being such that the supporting member will be rotated with the driven member but either one of these members may be rotated relative to the other upon the application of a force to the one member which is greater than the frictional forces connecting these members.

The light frictional connection is provided by means of a connecting assembly which includes a set of rotatable bearings, preferably ball bearings, disposed between the driven member and the supporting member. It is also preferred that a similar set of bearings be provided between the driven member and the fixed member or base with these two sets of bearings being disposed with their raceways in substantially abutting relationship with each other, as well as with the base and article-supporting member, respectively, so that the load or weight of the article being displayed will be transmitted directly through the raceways and bearing elements to the base.

Figure 1:
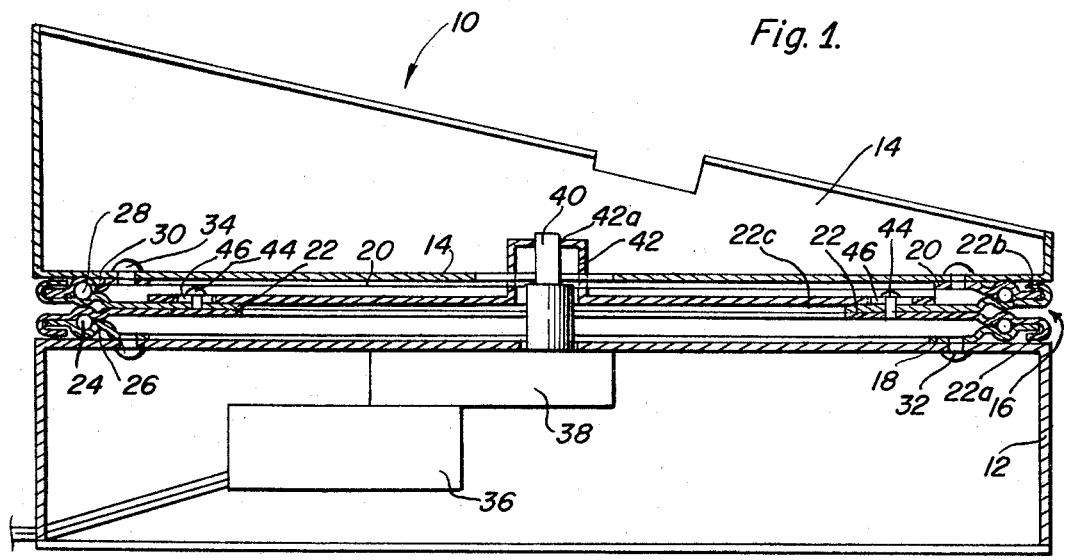
FIG. 1 is a sectional elevational view of a rotating article display mount constructed in accordance with this invention.
Figure 2:
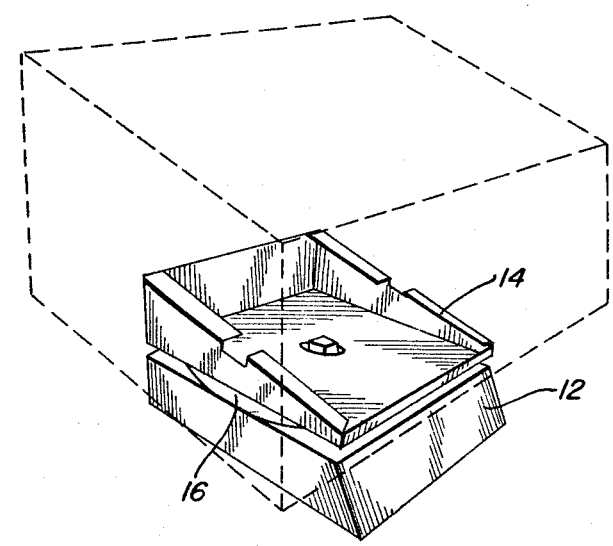
FIG. 2 is a perspective view of the article display mount, schematically showing the way in which a relatively heavy article such as an air conditioner would be mounted for rotation.
Figure 3:
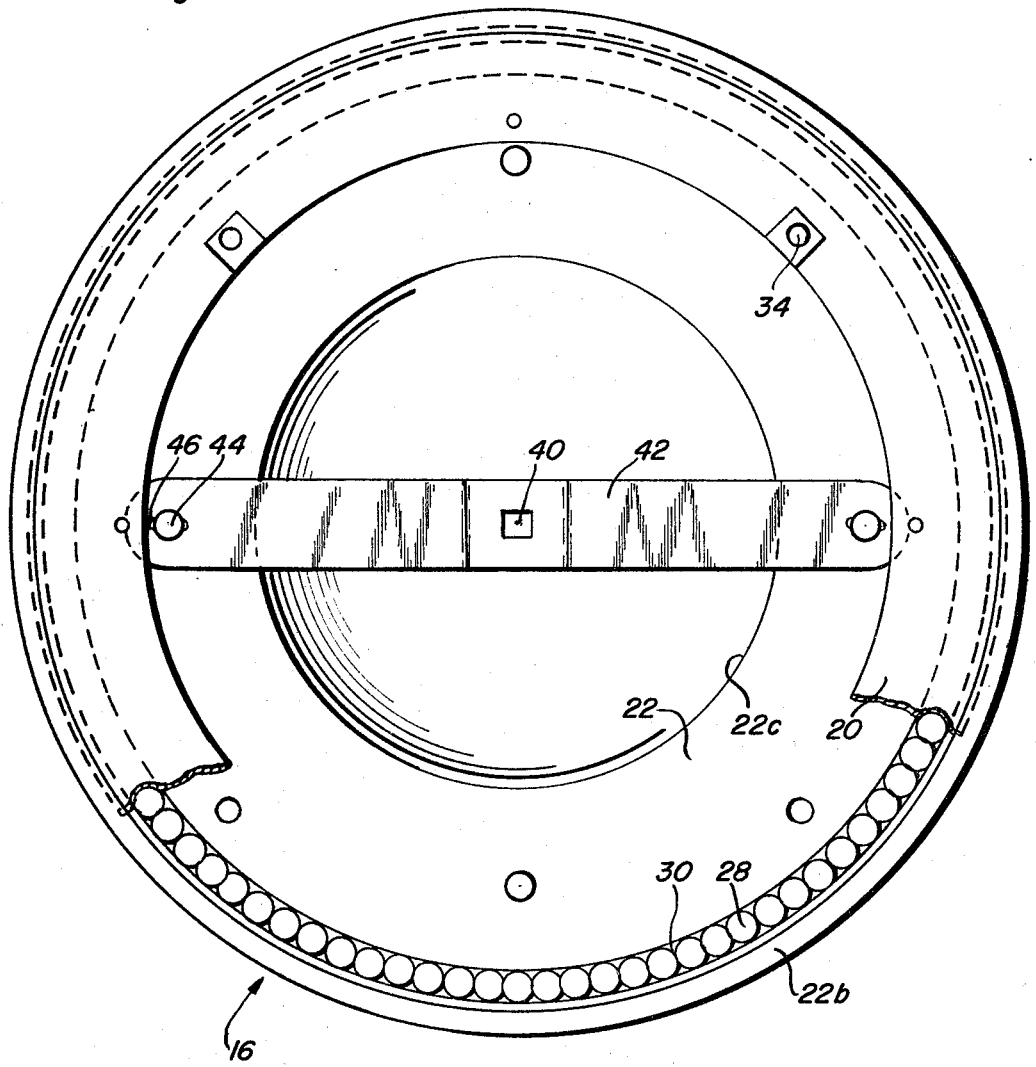
FIG. 3 is a top plan view of the connecting assembly with a portion thereof broken away to show one set of ball bearings.

With further reference to the drawings, and particularly to FIG. 1, the rotating article display 10 includes a base 12, an article-supporting fixture 14, and an assembly 16 disposed between and interconnecting the article-supporting fixture 14 to base 12. The connecting assembly 16 preferably includes a first annular disc 18, a second annular disc 20 and a driven member 22 disposed between the first and second annular discs 18 and 20. The discs and the driven member are held in close assembled relationship and for this purpose the peripheral edge portions 22a of the driven member are formed downwardly about the peripheral edge of the first annular disc 18, and the peripheral edge portions 22b of the driven member 22 are formed upwardly about the peripheral edge portions of the second annular disc 20.

It will be noted that the driven member 22 has a central aperture 22c, and this member is preferably formed by fastening two annular discs back to back, thus enabling the opposing edge portions 22a and 22b to be formed downwardly and upwardly about the first and second annular discs 18 and 20, respectively.

A first set of rotatable bearings 24 is disposed between the first annular disc 18 and the driven member 22 in an annular raceway 26 formed partially by the first annular disc 18 and partially by the driven member 22. A second set of rotatable bearings 28 is disposed between the second annular disc 20 and the driven member 22 in a second annular raceway 30 formed partially by the second annular disc and partially by the driven member. The bearings 24 and 28 are preferably ball bearings. The first annular disc 18 is connected to the base 12 preferably by means of fasteners 32 and the second annular disc 20 is connected to the article-supporting member or fixture 14 preferably by means of fasteners 34. It will be noted that the portion of the raceway 26 formed by or in the first annular disc is in substantially abutting relation with respect to the base, and the portion of the raceway 30 which is formed in the second annular disc 20 is in substantially abutting relation with respect to the article-supporting fixture 14. The portions of the raceways 26 and 30 which are formed by or in the driven member 22 are also in abutting relation and this abutting relationship throughout results in the transmission of the load applied to the article-supporting fixture 14 directly through the raceways and ball bearings to the base 12. This feature of transmitting the load from the article-supporting fixture to the base through the rather large diameter annulus of the stacked bearings and raceways of the connecting assembly 16 results in a very uniform distribution of forces and a very stable display mount. Thus the article-supporting fixture may stably support a very large heavy article such as an air conditioner and the weight of the article will be transmitted directly to the base 12 through the bearings and raceways.

In order to effect rotation of the driven member 22 with respect to the base 12 and the first annular disc 18 which is attached to the base, an electric motor 36 is provided which preferably operates through a gear reducer 38 to drive a shaft 40. In order to connect the driven member 22 to the shaft 40, there is provided a yoke 42 that spans the aperture 22c in the driven member. The ends of this yoke are preferably connected to the driven member 22 in such a manner that a slight amount of axial movement of the yoke is permitted. Such a connection may be accomplished by means of pins 44 affixed to the driven member and extending through slots 46 in the yoke 42. Thus any minor misalignment between the driven member 22 and the shaft 40 may be compensated by a slight axial movement of the yoke relative to the driven member. The end of the shaft 40 which may, for example, be square in cross section extends into a similarly shaped broached hole 42a in the yoke.

In operation, the shaft 40 is rotated by means of the motor 36 and this rotation is transmitted through the yoke 42 to the driven member 22. The driven member is thus rotated relative to the base 12 and to the first annular disc 18 which is affixed to the base, the ball bearings 24 serving to facilitate this relative rotational movement. The ball bearings 28 form the only connection between the driving member 22 and the second annular disc 20 which is affixed to the article-supporting fixture 14. This is a light rolling frictional force, and it may be easily overcome, as for example by the application of a relatively light manual force to the article-supporting fixture 14 or to the article being supported thereon. The article and article-supporting fixture will be rotated by the motor 36 in the absence of any such force, but should a person viewing the display wish to stop the rotation or to reverse it, or possibly even to speed it up manually, all that the person has to do is to exert a force on the article or article-supporting fixture. The fixture and the article will then stop or move independently of the driven member 22 which continues to be rotated by the motor 36. This relative movement between the fixture 14 and the driven member 22 is facilitated by the ball bearings 28.

From the foregoing it may be seen that a novel rotating article display mount has been provided which allows a manual manipulation of the article without damage to the driving means. The connection of the driving means to the article-supporting member is by means of light rolling friction which can be easily overcome by the application of a force to either the article or article-supporting fixture. Should the motor 36 be started at a time when the article-supporting fixture 14 is not free to move, no damage will result to the drive mechanism. The driven member will simply be rotated relative to the fixture.

Although the invention has been described with a certain degree of particularity, it is understood that the present disclosure has been made only by way of example and that many modifications and changes in various details may be resorted to without departing from the spirit and scope of the invention, as hereinafter claimed.

What is claimed is:

1. A rotating article display mount comprising a base, a first annular sheet metal disc attached to said base, an article-supporting fixture, a second annular sheet metal disc attached to said article-supporting fixture, a sheet metal driven member disposed intermediate said first and second annular discs and having peripheral edge portions in engagement with peripheral edge portions of said discs such that said discs and said driven member are held in proximate assembled relationship but are permitted to rotate relative to one another, a first annular ball bearing raceway formed partially by said first annular disc and partially by said driven member, a second annular ball bearing raceway formed partially by said second annular disc and partially by said driven member, rotatable bearing elements disposed within said raceways, and said first and second raceways being disposed remote from and concentric with the axis of rotation of said driven member and being disposed in substantially continuous abutting vertically aligned relation with each other and with said base and said article-supporting fixture respectively, whereby a load applied to said article-supporting means will be transmitted directly through said raceways and said bearing elements to said base, power motive means operatively connected to said driven member for effecting rotation of said driven member about its axis with respect to said base.

2. The structure of claim 1 wherein said driven member is centrally apertured and a yoke is mounted across said driven member aperture for limited transverse movement, said power motive means being operatively connected to said yoke, whereby said yoke may move transversely to compensate for any minor misalignment of the rotational axes of said driven member and said power motive means.

3. The structure of claim 1 wherein the peripheral edge portions of said driven member are formed about the peripheral edges of said first and second annular discs.

4. The structure of claim 1 wherein said driven member comprises a pair of annular sheet metal elements joined together in back to back relation with the peripheral edge portions of one of said elements being formed about the peripheral edges of said first annular disc and the peripheral edge portions of the other of said elements being formed about the peripheral edges of said second annular disc.

5. The structure of claim 2 wherein said yoke and said driven member are connected by means of pins which are affixed to one and extend through slots in the other.

References Cited

UNITED STATES PATENTS 2,587,788  3/1952  Tacy _____ 211—1.5 X

ROY D. FRAZIER, *Primary Examiner.*

FRANK DOMOTOR, *Assistant Examiner.*